US006986878B2

(12) United States Patent
Derdall

(10) Patent No.: US 6,986,878 B2
(45) Date of Patent: Jan. 17, 2006

(54) METHOD OF PRODUCING POTASSIUM SULFATE VIA CATION EXCHANGE

(75) Inventor: Gary Derdall, Saskatoon (CA)

(73) Assignee: Dirdal Rand Technologies, Saskatoon (CA)

( * ) Notice: Subject to any disclaimer, the term of this patent is extended or adjusted under 35 U.S.C. 154(b) by 298 days.

(21) Appl. No.: 10/322,516

(22) Filed: Dec. 19, 2002

(65) Prior Publication Data

US 2003/0113253 A1 Jun. 19, 2003

Related U.S. Application Data

(60) Provisional application No. 60/340,955, filed on Dec. 19, 2001.

(51) Int. Cl.
*C01D 5/00* (2006.01)
*C01B 17/96* (2006.01)
(52) U.S. Cl. .................. 423/552; 23/302 R; 423/181; 423/551; 423/DIG. 14
(58) Field of Classification Search ............... 423/551, 423/552, 181, DIG. 14; 23/302 R
See application file for complete search history.

(56) References Cited

U.S. PATENT DOCUMENTS

| | | | | |
|---|---|---|---|---|
| 3,096,153 A | * | 7/1963 | Hadzeriga | 423/181 |
| 3,369,867 A | * | 2/1968 | May | 423/197 |
| 3,429,657 A | * | 2/1969 | D'Arcy et al. | 423/181 |
| 3,687,639 A | * | 8/1972 | Barlow et al. | 423/552 |
| 4,504,458 A | | 3/1985 | Knudsen | 423/552 |
| 4,707,347 A | * | 11/1987 | Vajna et al. | 423/552 |
| 5,529,764 A | * | 6/1996 | Lampert et al. | 423/199 |
| 5,549,876 A | * | 8/1996 | Zisner et al. | 423/199 |
| 5,552,126 A | * | 9/1996 | Efraim et al. | 423/552 |
| 6,143,271 A | * | 11/2000 | Holdengraber et al. | 423/552 |
| 6,334,990 B1 | * | 1/2002 | Phinney | 423/551 |

FOREIGN PATENT DOCUMENTS

| EP | 0 199 104 | | 3/1986 |
|---|---|---|---|
| ES | 2 056 752 | * | 10/1994 |

* cited by examiner

*Primary Examiner*—Stanley S. Silverman
*Assistant Examiner*—Ardith E. Hertzog
(74) *Attorney, Agent, or Firm*—Ogilvy Renault LLP; Paul S. Sharpe

(57) ABSTRACT

A process for producing potassium sulfate from potash and sodium sulfate, which involves providing a source of sodium sulfate and passing the sodium sulfate through cationic exchanger. Eluted potassium sulfate containing sodium sulfate is reacted with potash to form further potassium sulfate.

9 Claims, No Drawings

METHOD OF PRODUCING POTASSIUM SULFATE VIA CATION EXCHANGE

FIELD OF THE INVENTION

The present invention relates to a method of producing potassium sulfate and more particularly, the present invention relates to a formulation method using potash and sodium sulfate brines.

BACKGROUND OF THE INVENTION

Potassium sulfate(SOP) is a specialty potash fertilizer produced in the amount of about 3 million tonnes per year. SOP is used on high value crops such as citrus and tobacco that are sensitive to the chloride ion in regular potash. It represents about 5% of the total potash fertilizer market. It is produced by combining potash with a source of sulfate. Some process plants use sulfate from sulfuric acid (the Mannheim processes of Belgium), others use magnesium sulfate as in Germany, some use langbeinite as in Carlsbad USA, while other process use sulfate brines such as at Great Salt Lake.

Some processes have used sodium sulfate such as plants at Searles Lake, Calif., started by Garrett Research and Development in the late 1930's and a plant operated by Potash Corporation of Saskatchewan in the 1980's. Process efficiencies were low. In another approach, a couple of processes developed by Potash Corporation (PCS) and Superfos of Denmark utilized a new process mechanism wherein anion exchange resin was employed with dilute sulfate brines. Scale up, process conditions and dilution due to resin absorption of water proved to be troublesome.

Despite the apparent simplicity of using sodium sulfate, which is available both as natural and synthetic material in North America and Europe, there is little use of this material as a direct feedstock. The major reason for this is the formation of an intermediate sodium potassium double salt termed glaserite when potash and sodium sulfate are reacted in proportions suitable for a high yield. The glaserite must be reacted with further potash to produce potash sulfate. Because of the complexity of the reaction there is a need for extensive recycle and evaporation to obtain significant yields. Evaporative loads of between 8 and 10 tonnes of water per tonne of product are needed which is very costly.

In an attempt to overcome the problems with the glaserite field, PCS and Superfos utilized anion exchange. Provided that the pH conditions and sulfate dilution was correct, the process worked within the limitations of conventional ion exchange devices. However, with the Superfos process, as levels of acidity rose in the crystallizer, formation of potassium bisulfate occurred which needed expensive potassium hydroxide to restore the system to conditions where potash would salt out potassium sulfate in the crystallizer.

In the PCS approach, only very dilute sulfate brines would fully displace chloride ion on the resin. As sulphate ion concentration rose, the resin efficiency dropped dramatically. This system worked satisfactorily only for dilute systems with a chloride ion bleed. For more concentrated solutions of sodium sulfate, such as one to two molar found to be desirable for most processes, process efficiencies become troublesome. With the low equivalency of anion resin (typically about 1.1 equivalents per litre in a working plant), the presence of chloride dropped resin capacity to the range of 0.5 equivalents per liter. The amount of resin needed for larger scale production grew significantly as did the amount of water absorbed by the resin into the process stream. The evaporative load becomes very high. With conventional fixed bed designs, dilution, washing losses and inefficiencies lead to high operating costs.

SUMMARY OF THE INVENTION

To overcome these deficiencies in the use of higher levels of sodium sulfate and potash to produce potassium sulfate, this application presents a new mechanism for the production of potassium sulfate. It is a synchronous process consisting of highly efficient cation exchange in conjunction with reacting sodium sulfate with potash in the crystallizer in the conventional sense, but avoiding reaction conditions and reactant concentrations that would lead to glaserite formation.

One object of one embodiment of the present invention is to provide a process for producing potassium sulfate from potash and sodium sulfate, comprising:
  providing a source of hot concentrated sodium sulfate brine;
  passing the sodium sulfate brine, in molar excess, through a potassium cationic exchanger; and
  reacting eluted potassium sulfate brine containing sodium sulfate with solid potash to form further potassium sulfate.

DESCRIPTION OF THE PREFERRED EMBODIMENTS

In greater detail, cation (2–2.4 equivalents per liter) resin in the potassium form is treated with excess sodium sulfate, in the range of 2 molar at a temperature optimally in the range of 60 and 90° C., producing a high yield of potassium sulfate and a brine with excess sodium sulfate in an amount from about between 200 and 250 grams per liter. This step efficiently transforms the cation resin to the sodium form. The resultant liquor is cooled to most desirably between 30° C. and 35° C. and fed to a salt out crystallizer tank wherein solid potash is added to salt out the potassium sulfate and reacts with the excess sodium sulfate in the production brine to form additional potassium sulfate. The sodium sulfate in the production brine is managed so that the sodium chloride concentration of the salt out crystallizer does not rise above 10%. This can easily be done by specific gravity.

The salt out crystallizer is best operated in a multiple stage configuration with fines recycle to yield a larger and more uniformly sized crystalline product. The crystals can be screened and centrifuged and the brines sent on to an evaporator for sodium chloride removal and potash recovery and recycle. The potash is dissolved to make a rich brine. This is then sent to the sodium laden resin bed to convert the sodium form of the resin to the potassium form. In the case of fixed bed designs, the potash solution is best kept in the one molar concentration range.

Spent regeneration brine can be evaporated or sent to an evaporation pond whereby winter cooling, in due course, will crystallize out potash values for recovery. More advantageously, using continuous ion exchange devices such as the Himsley unit, potash regeneration brines of higher concentrations are used in the manner of a displacement plug to efficiently accomplish the transformation of sodium laden cation resin to potassium laden cation resin by mass action. After regeneration, the potassium laden resin is ready to be used in the production zone by contact with excess sodium sulfate.

The advantages of using this novel process concept can be seen in the following manner by recalling that the process does not run into the glaserite field nor does it encounter the difficulties of anion exchange associated with the use of concentrated solutions of sodium sulfate. In respect of the use of cation resin for the ion exchange component, for concentrated sodium sulfate brines, the amount of cation resin needed, with capacities of 2.0 to 2.4 equivalents per litre, is much lower than that for anion exchange. The synchronous process is also not sensitive to chloride ion in the feedstock as with the anion process.

This arises because anion resin loads only to the extent of about 0.5 equivalents per litre with more concentrated values of sodium sulfate due to inhibition by chloride ion and this problem is not present in the cation system.

Since resin acts like a sponge in drawing process water into a system contributing to dilution of brine streams, the amount of evaporation is dramatically reduced with a cation system leading to lower costs and higher efficiencies. In addition, by combining the reaction of sodium sulfate and potash with the cation ion exchange, the circuit volume is dramatically reduced thereby lowering capital costs. With the synchronous cation process, the overall production of potassium sulfate is in the range of 250 g/l in the crystallizer in comparison with other processes, such as anion exchange, that typically produce between 40 and 60 g/l of potassium sulfate. This is an improvement of roughly a factor of six. Therefore in this art, there is significant process intensification over the anion exchange and has a similar advantage over other brine type processes such as that at Great Salt Lake. Process intensification significantly lowers capital costs over other processes. In addition, variable costs, such as for utilities, are dramatically reduced.

This approach to converting sodium sulfate to potassium sulfate using potash provides a new and highly efficient method for utilizing sulfate waste streams and underutilized sodium sulfate deposits to produce a valuable fertilizer product. Potash efficiencies of between 90 and 95% and evaporative loads in the range of 2 to 3 tonnes of water per tonne of product can be achieved with significantly reduced capital and operating costs.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A process for producing potassium sulfate from potash and sodium sulfate, comprising:
   providing a source of hot concentrated sodium sulfate brine in a temperature range of between 60° C. and 90° C. and a concentration of between 200 and 250 grams per liter;
   passing said sodium sulfate brine, in molar excess, through a potassium cationic exchanger; and
   reacting eluted potassium sulfate brine containing sodium sulfate with solid potash to form further potassium sulfate.

2. The process as set forth in claim 1, wherein eluted potassium sulfate brine is cooled to between 30° C. and 35° C.

3. The process as set forth in claim 2, wherein said reacting is conducted in a crystallizer.

4. The process as set forth in claim 3, further including the step of adding solid potash to said crystallizer to cool the system to a temperature between 30° C. and 35° C. to yield potassium sulfate crystals.

5. The process as set forth in claim 3, wherein subsequent to elution of said potassium sulfate, said potassium sulfate brine is evaporated to produce potash for regeneration of said sodium resin to said potassium form.

6. The process as set forth in claim 3, further including the step of maintaining sodium chloride concentration in said crystallizer of not greater than 10% by weight.

7. The process as set forth in claim 1, wherein said sodium sulfate brine is maintained at a temperature of between 60° C. and 90° C. in said cationic exchanger.

8. The process as set forth in claim 1, wherein said exchanger comprises a fixed bed ion exchange system.

9. The process as set forth in claim 1, wherein said exchanger comprises a continuous bed ion exchange system.

* * * * *